(12) United States Patent
Wang et al.

(10) Patent No.: US 7,225,798 B2
(45) Date of Patent: Jun. 5, 2007

(54) DEVICE COMBING FUEL CONTROL VALVE AND CARBON CANISTER, OR FUEL TANK

(75) Inventors: Aaron Wang, Taoyuan-Hsien (TW); Chun-Chao Huang, Taoyuan-Hsien (TW)

(73) Assignee: Sentec E&E Co., Ltd., Taoyuan (TW)

( * ) Notice: Subject to any disclaimer, the term of this patent is extended or adjusted under 35 U.S.C. 154(b) by 120 days.

(21) Appl. No.: 11/140,177

(22) Filed: May 31, 2005

(65) Prior Publication Data

US 2006/0266337 A1    Nov. 30, 2006

(51) Int. Cl.
*F02M 33/02*    (2006.01)
(52) U.S. Cl. .................................. 123/518; 123/520
(58) Field of Classification Search ............... 123/516, 123/518, 519, 529
See application file for complete search history.

(56) References Cited

U.S. PATENT DOCUMENTS

| | | | | |
|---|---|---|---|---|
| 4,193,383 A | * | 3/1980 | Rogers ....................... 123/520 |
| 4,852,761 A | * | 8/1989 | Turner et al. ................. 220/746 |
| 5,036,823 A | * | 8/1991 | MacKinnon .................. 123/520 |
| 5,560,342 A | * | 10/1996 | Fournier et al. .............. 123/509 |
| 5,582,198 A | * | 12/1996 | Nagino et al. ................. 137/43 |
| 5,704,337 A | * | 1/1998 | Stratz et al. ................. 123/519 |
| 5,996,607 A | * | 12/1999 | Bergsma et al. .............. 137/202 |
| 6,016,827 A | * | 1/2000 | Dawson ....................... 137/202 |
| 6,182,693 B1 | * | 2/2001 | Stack et al. ............. 137/565.17 |
| 6,269,802 B1 | * | 8/2001 | Denis et al. .................. 123/519 |
| 6,273,070 B1 | * | 8/2001 | Arnal et al. .................. 123/519 |
| 6,367,458 B1 | * | 4/2002 | Furusho et al. ............... 123/519 |
| 6,463,915 B2 | * | 10/2002 | Ozaki et al. .................. 123/519 |
| 6,467,464 B2 | * | 10/2002 | Burke et al. .................. 123/520 |
| 6,564,821 B1 | * | 5/2003 | Orenstein et al. ............ 137/202 |
| 6,698,475 B2 | * | 3/2004 | Schaefer et al. .............. 141/325 |
| 6,810,900 B2 | * | 11/2004 | Kato ........................... 137/202 |
| 7,047,948 B2 | * | 5/2006 | Gerhardt et al. ............. 123/516 |
| 7,055,556 B2 | * | 6/2006 | Benjey et al. ................... 141/6 |
| 7,086,389 B2 | * | 8/2006 | Yamada ........................ 123/516 |
| 7,100,580 B2 | * | 9/2006 | Lin et al. ..................... 123/516 |
| 7,134,426 B2 | * | 11/2006 | Uchino et al. ............... 123/518 |
| 2005/0284450 A1 | * | 12/2005 | Mills ........................... 123/519 |
| 2006/0207576 A1 | * | 9/2006 | Mills et al. ................... 123/519 |

* cited by examiner

*Primary Examiner*—Thomas Moulis (57) ABSTRACT

A device combines a fuel control valve in a hollow can and a carbon canister, which can be further combined with a fuel tank. The device has a first chamber for preventing draining fuel and a second chamber containing active carbon. The first chamber is formed with a gas tube which is connected to the fuel tank and a gas channel connected to the second chamber. The second chamber is formed with a gas return tube. As such, the device combining the fuel control valve and the carbon canister is constructed. The hollow can is assembled to a lateral wall of the fuel tank and the gas tube can be connect with the fuel tank to form an integral structure.

16 Claims, 7 Drawing Sheets

DEVICE COMBING FUEL CONTROL VALVE AND CARBON CANISTER, OR FUEL TANK

FIELD OF THE INVENTION

The present invention relates to combination structures, and in particular to a device combining a fuel control valve and an active carbon canister or a fuel tank.

BACKGROUND OF THE INVENTION

In conventional, to solve the problem of evaporation of fuel gas in the fuel tank of a car, generally, a fuel gas return channel is added to the fuel tank. Through the negative pressure, the fuel gas returns to the gas inlet end of an internal combustion engine to be used by the engine. Thereby the fuel gas cannot vent outside to cause pollution.

In above mentioned gas return channel, a carbon canister (C/N) is arranged for absorbing evaporated fuel gas. To prevent the drainage of the fuel as the car is tilted, a fuel control valve is added to the gas return tube for closing the gas return tube immediately as the car falls down so that the fuel gas and the fuel will not drain out to cause pollution. Besides, to prevent an over large expansion pressure of the fuel gas in the fuel tank to induce explosion or deformation of the fuel tank, a bypass valve is serially connected to the gas return tube adjacent to the fuel tank. When the fuel tank or the gas return tube is blocked, the valve can be opened for releasing fuel pressure to protect the fuel tank.

Conventionally, the gas return tube connected to the fuel tank and the gas inlet of the engine is formed by using soft tubes to be connected between the fuel control valve and the bypass valve or connected between the fuel control valve, the carbon canister and the bypass valve. However, the longer the soft tubes or the larger number the soft tubes is used, the greater the resistance in the gas return tube is presented, which will reduce the absorption force of negative pressure. Thereby fuel gas cannot be reused smoothly. Furthermore, conventional fuel control valve, carbon canister and bypass valve, etc. have complicated structures so that the manufacturing and assembling processes are time consuming and cost ineffective. The soft tubes may be arranged disordered to occupy a larger space.

SUMMARY OF THE INVENTION

Accordingly, the primary object of the present invention is to provide a device combining a fuel control valve and a carbon canister, wherein when a car is tilted, the fuel gas or fuel liquid can be prevented from draining out. When fuel in the fuel tank overflows, it will be prevented from draining out. The fuel control valve is assembled with the carbon canister so that less soft tubes are used to reduce the manufacturing and assembling cost. Thereby the hollow can with functions of cutting fuel as fuel drains out and absorbing fuel (or store fuel temporarily) is assembled to the fuel tank so as to reduce the cost and time in assembly. The bypass valve in the hollow can could release over pressure fuel gas so as to reduce the use of soft tube. The reduction of soft tube connected between the fuel tank and air inlet of the fuel tank is beneficial to the reduction of the flowing resistance of the fuel gas. The structure of the present invention is simple and can be assembled easily.

To achieve above object, the present invention provides a device combining a fuel control valve and a carbon canister; a hollow can being installed between a fuel tank and a fuel gas inlet of an engine for returning evaporated fuel gas in the fuel tank to the air inlet of the engine; a first chamber and a second chamber formed in the hollow can; a tapered tank and a main valve gate being formed in the first chamber; a trench being formed in the tapered tank; a bottom of the tapered tank being formed with a gas tube communicated to an evaporation chamber in the fuel tank; a gas channel being formed in the main valve gate and being connected to the second chamber; a rolling element and a floatable plug element being installed within the first chamber; the floatable plug element being movably installed between the rolling element and the main valve gate; and a top end of the floatable plug element being installed with a plug for closing or opening the main valve gate; a plurality of non-woven cloth and active carbon being installed within the second chamber; and at least one gas return tube being connected to a fuel gas inlet of the second chamber.

Furthermore, a device combining a fuel control valve, a carbon canister and a fuel tank; a hollow can being installed between a fuel tank and a fuel gas inlet of an engine for returning evaporated fuel gas in the fuel tank to the air inlet of the engine. Other than above mentioned structure, the device further comprises a fuel tank having a casing; an assembled hole being formed on the casing so that the casing is communicated to an evaporation chamber above a surface of fuel liquid; and the gas tube being connected with the assembled hole to guide fuel gas in the fuel tank to flow into the first chamber.

The various objects and advantages of the present invention will be more readily understood from the following detailed description when read in conjunction with the appended drawing.

DETAILED DESCRIPTION OF THE PREFERRED EMBODIMENTS

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
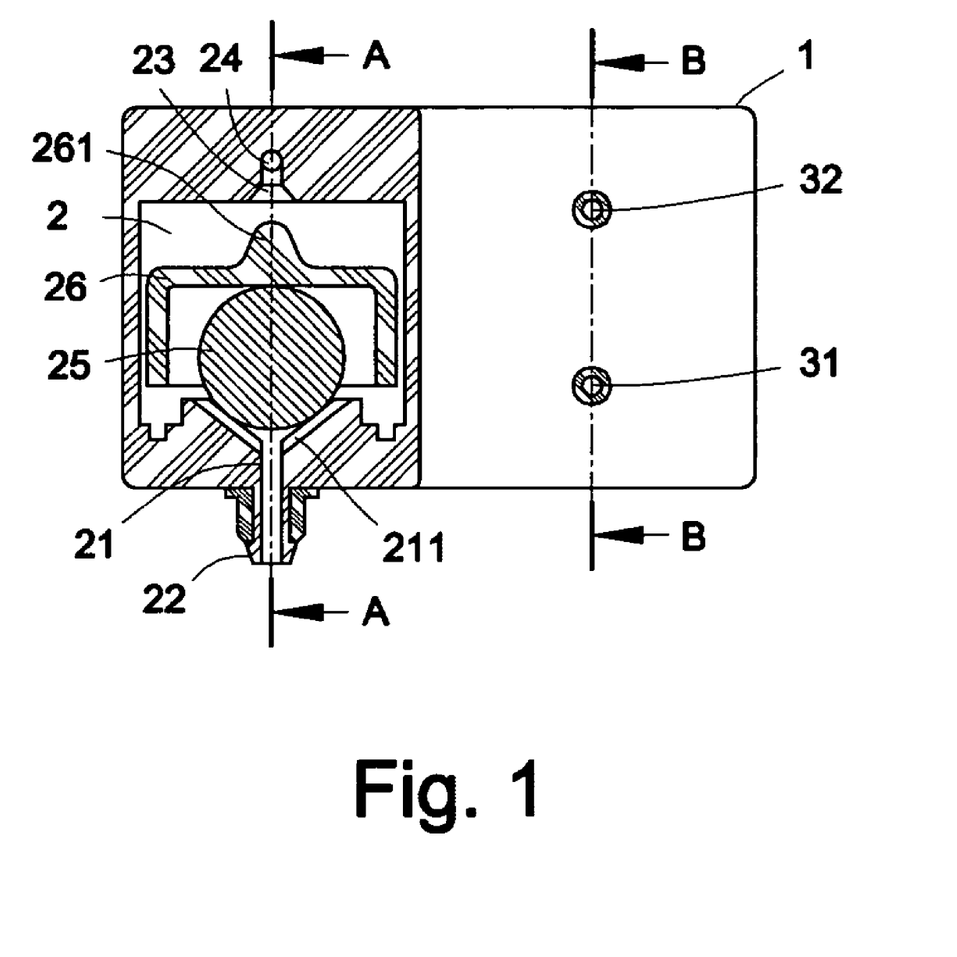
FIG. 1 is an elevational cross sectional view for the first embodiment of the present invention, wherein the hollow can is formed with a first chamber and a second chamber, and the first chamber is installed with a rolling element and a floatable plug element.
Figure 2:
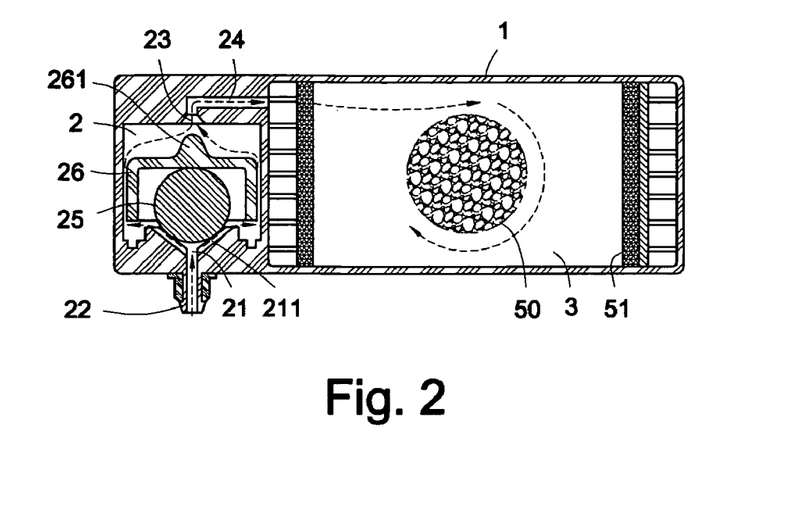
FIG. 2 is a cross sectional view along line A—A of the FIG. 1, and a bottom of the first chamber has a gas tube and a gas channel connected to the second chamber.
Figure 3:
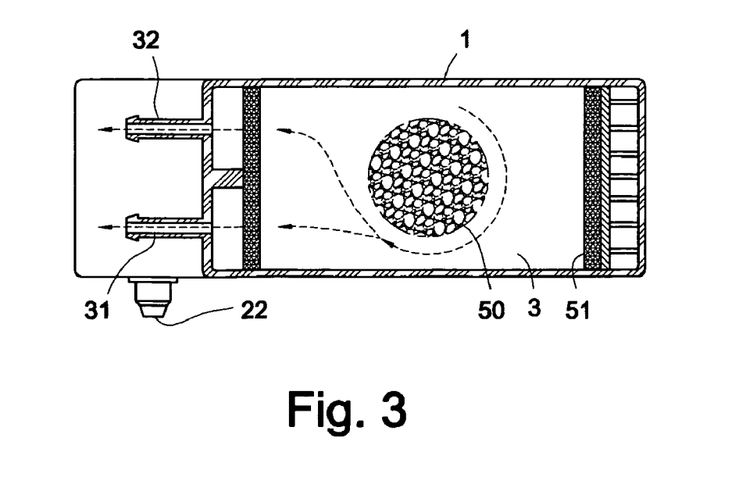
FIG. 3 is a cross sectional view along line B—B of FIG. 2, wherein the second chamber is a carbon canister and has a venting tube and a gas return tube.

Referring to FIGS. 1 to 3, the arrangement of the first embodiment of the present invention is illustrated. A transversal hollow can 1 is installed with a first chamber 2 and a second chamber 3 which are spaced at two sides of the hollow can 1.

An interior of the first chamber 2 is installed with a vertical tapered tank 21 and a concave main valve gate 23 (referring to FIGS. 1 and 2). An interior of the tapered tank 21 is formed with a trench 211. A bottom of the tapered tank 21 is installed with a protruded and vertical gas tube 22 which is communicated to a fuel tank 4 (referring to FIG. 4). The main valve gate 23 is installed with a gas channel 24 which is communicated to the second chamber 3. An interior of the first chamber 2 is installed with a rolling element 25 and a floatable plug element 26. The rolling element 25 is for example a steel ball which is received in the tapered tank 21 and rolls freely. The floatable plug element 26 may be for example a U shape cover which can float upon a surface of fuel liquid so that the floatable plug element 26 is movably installed between the rolling element 25 and the main valve gate 23 and is thus pushed by the rolling element 25 and the fuel liquid. A top of the floatable plug element 26 is formed with a cambered convex plug 261. If the rolling element 25 moves upwards by a pushing force or by the fuel liquid, the plug 261 will close the main valve gate, or else the plug 261 will open the main valve gate 23. Thus, the fuel control valve in the transversal hollow can 1 according to the present invention is constructed.

Besides, an interior of the second chamber 3 is installed with a plurality of non-woven cloth 51 and active carbon 50 (referring to FIGS. 2 and 3). The non-woven cloth 51 serves to prevent the active carbon 50 from draining out. The non-woven cloth 51 and active carbon 50 serve to as filter for filtering impurities in the fuel. Furthermore, the second chamber 3 has at least one gas return tube 32 (referring to FIGS. 1 and 3) which may be connected to a fuel gas input end of an internal combustion engine for supplying return fuel gas. Furthermore, the second chamber 3 may be further installed with an extra fuel gas flow tube 31 which is connected to outside for balancing the internal pressure (expansion pressure or vacuum pressure) in the fuel tank 4.

Furthermore, the second chamber 3 is formed as a carbon canister for absorbing fuel gas (or storing fuel gas temporarily). Thereby the second chamber 3 is integrally formed with fuel control valve in the transversal hollow can 1.

The vertical gas tube 22 in the hollow can 1 can be connected to the fuel tank 4 through a soft tube for receiving evaporated fuel gas. Or in the following second embodiment, the transversal hollow can 1 and the fuel tank 4 are integrally formed without using any soft tube.

In the second embodiment of the present invention (referring to FIG. 4), the transversal hollow can 1 is integrally formed with the fuel tank 4. A fuel filling opening 44 is formed on the fuel tank 4 so that fuel liquid 41 can be filled into the fuel tank 4. An evaporation chamber 42 is formed above the surface of the fuel liquid 41 in the fuel tank 4. At the top of the fuel tank 4 is formed with an assembled hole 43 which is communicated to the evaporation chamber 42. The gas tube 22 can be received in the assembled hole 43 so that the fuel gas in the fuel tank 4 can be guided into the first chamber 2 with lower resistance and the hollow can 1 can be assembled at the top of the fuel tank 4. Thereby the assembled body according to the present invention is constructed.

According to above mentioned structure, when fuel is supplied in a normal condition (referring to FIG. 4), the fuel gas inlet end of the engine has a negative pressure which will absorb the fuel gas in the transversal hollow can 1 through the gas return tube 32 (referring to FIG. 3) so that the evaporated fuel gas in the fuel tank 4 will flow through the gas tube 22, trench 211, main valve gate 23 and gas channel 24 to be transferred to the second chamber 3 to be absorbed (or stored temporarily), and then flows to gas inlet of the engine with less resistance and then is mixed with new formed fuel gas to be supplied to the engine.

Figure 5:
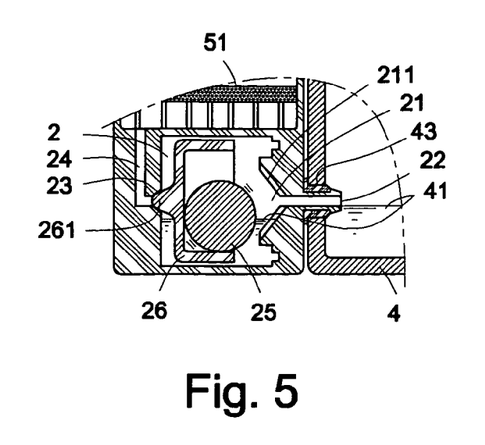
FIG. 5 is a schematic view for the operation of the present invention, where when a car is tilted, the rolling element will push the floatable plug element so that the plug is embedded in the main valve gate to close a fuel channel.

When a car is tilted, the fuel tank 4 and the transversal hollow can 1 at the top thereof may be tilted as of FIG. 5. The rolling element 25 in the first chamber 2 will roll out to push the floatable plug element 26. As a result the plug 261 of the floatable plug element 26 will be embedded into the main valve gate 23 and the gas channel 24 is closed. No fuel gas in the fuel tank 4 will drain out.

Figure 6:
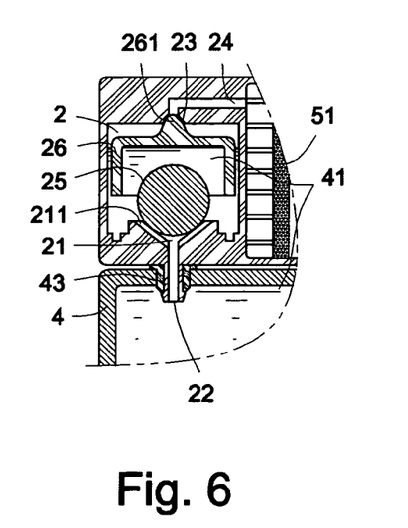
FIG. 6 is another operational schematic view of the present invention, wherein when the fuel is overflow, the drain fuel liquid will push the floatable plug element to move upwards so that the plug is embedded into the main valve gate to seal the fuel channel.

When the fuel in the fuel tank 4 is overflow, the fuel liquid 41 will drain to the first chamber 2 of the transversal hollow can 1 through the gas tube 22 and the trench 211 (referring to FIG. 6). The floatable plug element 26 will float upwards with the level of the fuel liquid 41 so that the plug 261 embeds into the main valve gate 23 to close the gas channel 24 so as to prevent the fuel liquid from flowing into the second chamber 3. Thus the fuel liquid 24 is prevented from draining out.

Figure 7:
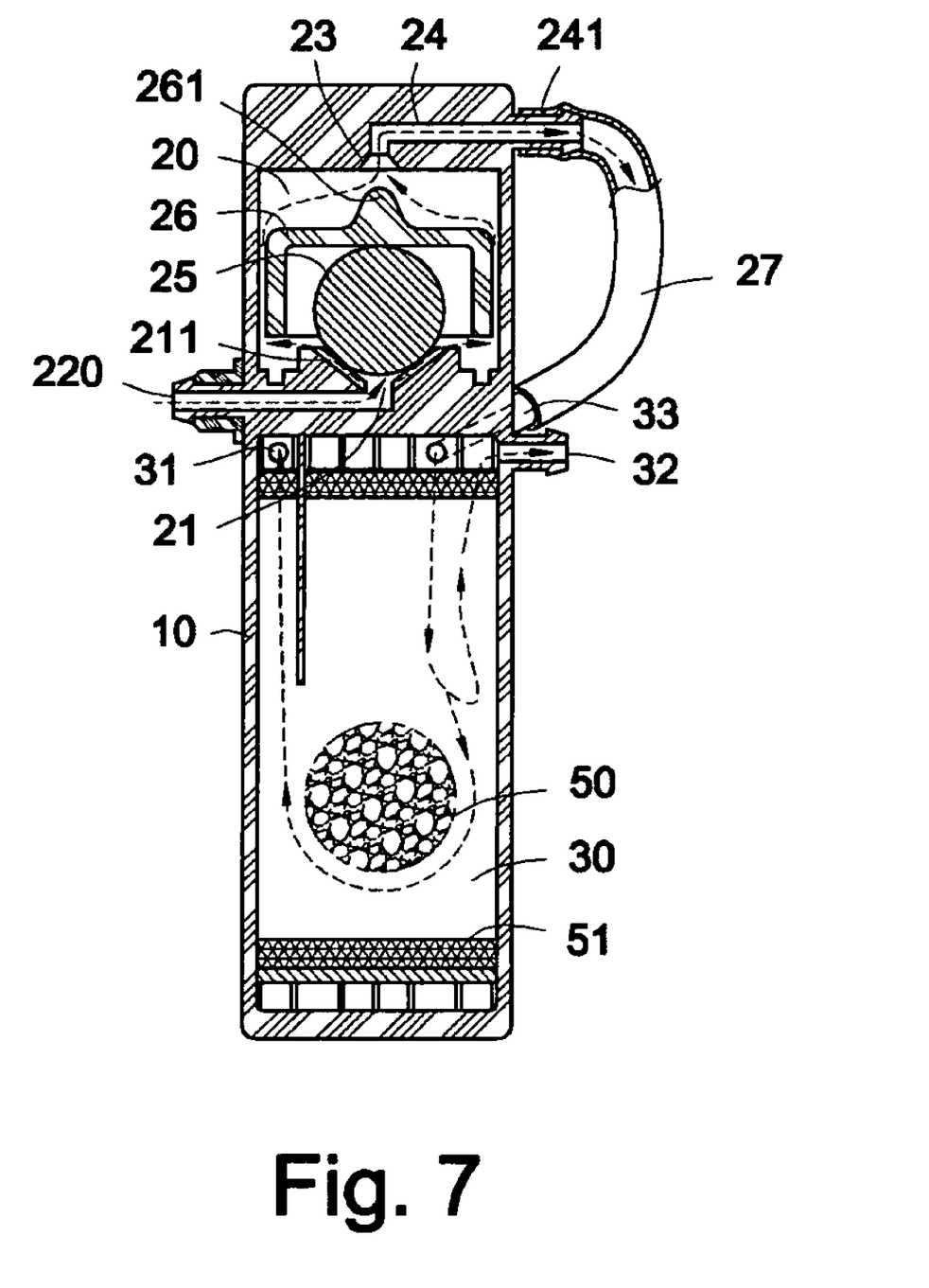
FIG. 7 shows the third embodiment of the present invention, wherein a vertical hollow can is disclosed, it uses a connecting tube to guide fuel gas into the second chamber.
Figure 8:
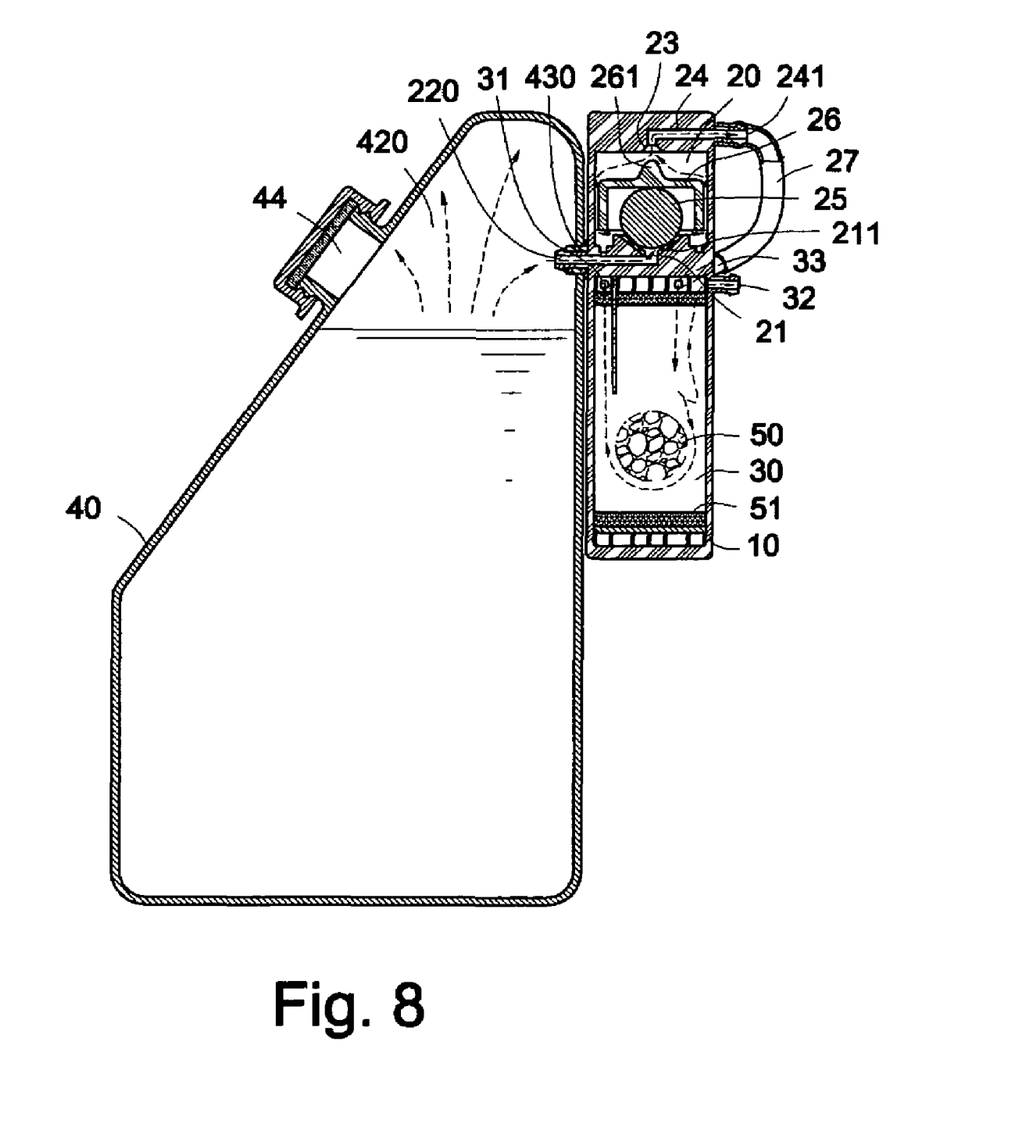
FIG. 8 is a cross sectional view for the fourth embodiment of the present invention, wherein a vertical hollow can is assembled to a lateral side of the fuel tank so that the connecting tube is embedded into the assembled hole 43 to form an assembled body of the hollow can and the fuel tank.

Besides, referring to FIG. 7, the third embodiment of the present invention is illustrated. The difference of this embodiment is that the hollow can 1 is arranged vertically. The vertical hollow can 1 is formed with a first chamber 20 and a second chamber 30 which are spaced vertically. The first chamber 20 has a vertical channel 24 which is formed with a connecting tube 241. The first chamber 20 has a gas tube 220 which extends to a lateral side of the first chamber 20. Furthermore, a guide tube 33 is added to the second chamber 30. A connecting tube 27 serves to connect the connecting tube 241 to the guide tube 22 so that fuel gas in the first chamber 20 will be guided to the second chamber 30. Other structure of this embodiment is identical to those above said embodiments and thus the details will not be described herein.

Figure 4:
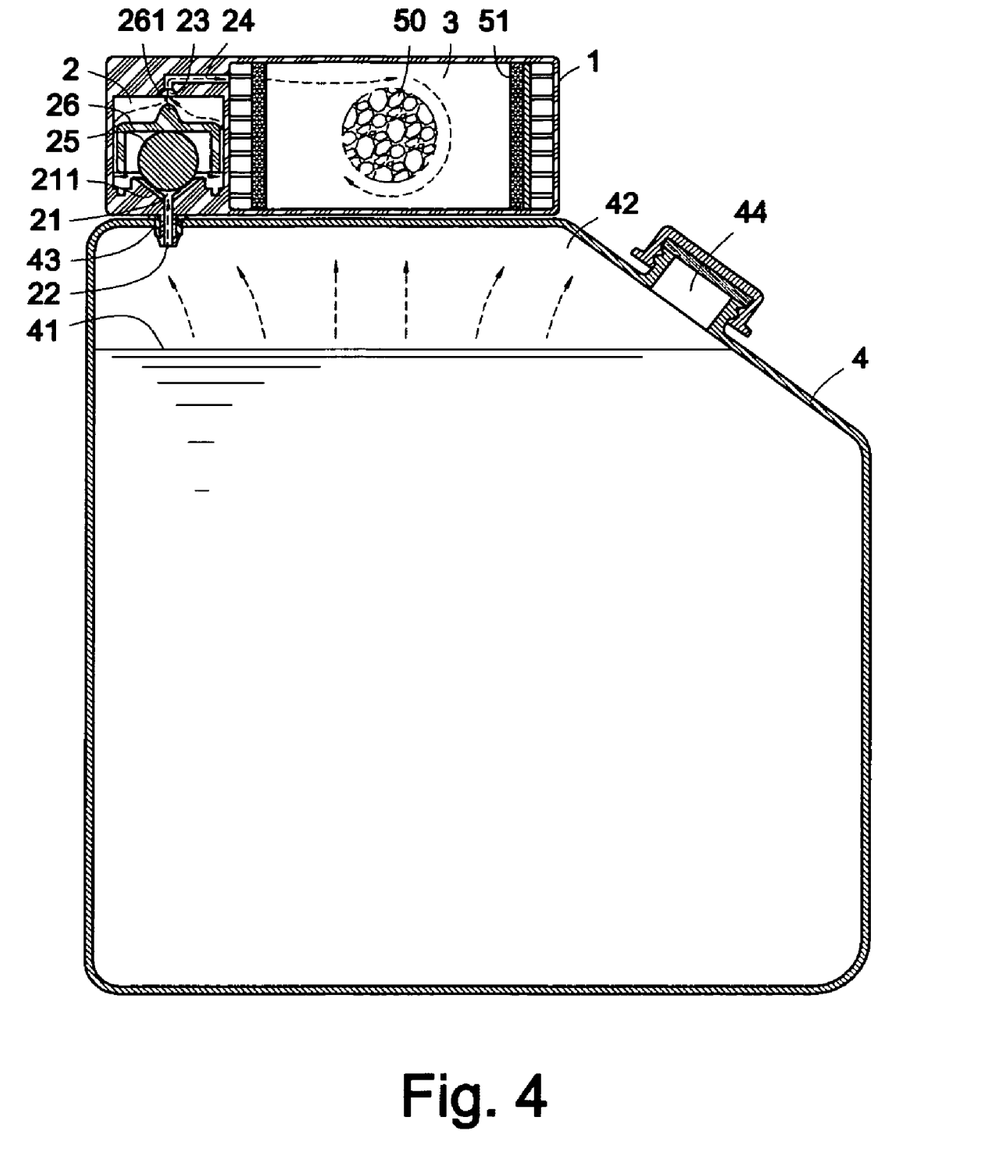
FIG. 4 is a cross sectional view for the second embodiment of the present invention, where a transversal hollow can is assembled to a top of a fuel tank, so that the gas tube is embedded into an assembled hole so as to form an assembled body of the hollow can and the fuel tank.

Referring to FIG. 4, a fourth embodiment of the present invention is illustrated. In this the present invention, the vertical arranged hollow can 10 is arranged at a lateral side of the fuel tank 40. The assembled hole 430 is formed at one side of the fuel tank 40. The assembled hole 430 is communicated to an evaporation chamber 420 so that the lateral arranged gas tube 220 is embedded into the assembled hole 430 at the lateral side of the fuel tank 4. Thereby the vertical hollow can 10 can be easily assembled to the fuel tank 40. Other structure of this embodiment is identical to those above said embodiments and thus the details will not be described herein.

Figure 9:
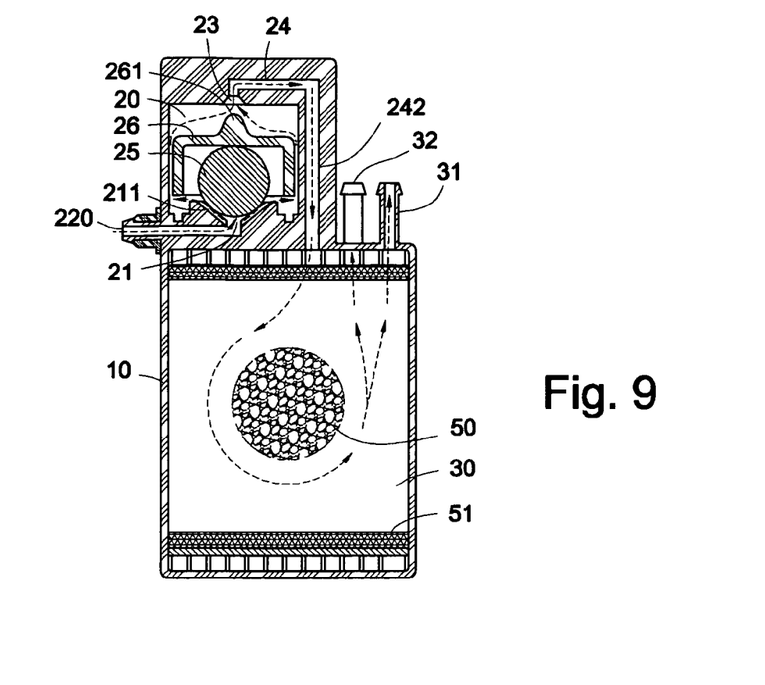
FIG. 9 shows a cross sectional view for the fifth embodiment of the present invention, where the vertical hollow can has a gas channel which has an extended channel and the extended channel is communicated to the second chamber.

With reference to FIG. 9, a fifth embodiment of the present invention, which is extended from the third and fourth embodiments of the present invention. The difference of this embodiment will be described hereinafter. The gas channel 24 in the vertical hollow can 10 directly extends to a bottom of the first chamber 2 so as to form an extension channel 242 which is communicated to the second chamber 30. Thereby the fuel gas in the first chamber 20 of the hollow can 1 is guided into the second chamber 30. Other structure of this embodiment is identical to those above said embodiments and thus the details will not be described herein. It can be assembled to a lateral side of the fuel tank 40 as in the fourth embodiment.

Figure 10:
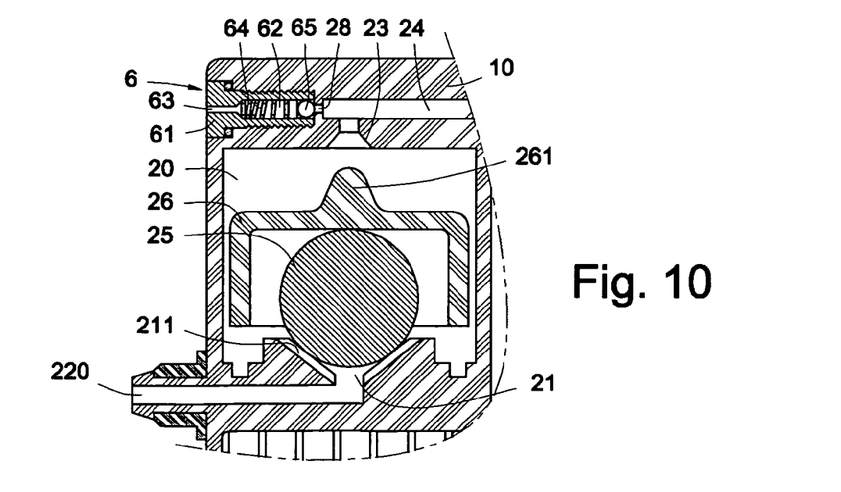
FIG. 10 shows the cross sectional view for the sixth embodiment of the present invention, wherein a bypass valve is installed with the gas channel for reducing the expansion pressure of fuel gas.

The sixth embodiment of the present invention will be described herein, which can be used in above mentioned first to fifth embodiments. The gas channel 24 in the transversal hollow can 1 or vertical hollow can 10 is formed with a pressure releasing hole 28 and is connected to a bypass valve 6 which is communicated with outside (referring to FIG. 10). The bypass valve 6 includes a lock stud 61 on the hollow can 1 or 10. The lock stud 61 is formed with a venting hole 63 and a spring receiving hole 62 which are communicated to the pressure releasing hole 28. A spring 64 is installed within the spring receiving hole 62. The spring 64 pushes against a round ball 65 for sealing or opening the pressure releasing hole 28. The venting hole 63 is communicated to outside. Thereby when the fuel gas flow tube 31 is blocked so that the fuel expansion pressure in the fuel tank 4 is too large, for example over 4 Psi, the fuel gas in the fuel channel will push the round ball 65 in the bypass valve 6 to open the pressure releasing hole 28 so that the expansion pressure of the fuel tank 4 or 40 will be released to balance the internal pressure of the fuel tank 4 or 40.

Advantages of the present invention will be described hereinafter. When a car is tilted, the fuel gas or fuel liquid will be prevented from draining out. When fuel is overflow in the fuel tank, it will be prevented from draining out. The fuel control valve is assembled with the carbon canister so that less soft tube is used so as to reduce the manufacturing and assembling cost. Thereby the hollow can with functions of cutting fuel as fuel drains out and absorbing fuel (or store fuel temporarily) is assembled to the fuel tank so as to reduce the cost and time in assembly. The bypass valve in the hollow can could release over pressure fuel gas so as to reduce the use of soft tube. The reduction of soft tube connected between the fuel tank and air inlet of the fuel tank is beneficial to the reduction of the flowing resistance of the fuel gas. The structure of the present invention is simple and can be assembled easily.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A device combining a fuel control valve and a carbon canister in a hollow can being installed between a fuel tank and a fuel gas inlet of an engine for returning evaporated fuel gas in the fuel tank to the engine, the hollow can comprising a first chamber for installing the fuel control valve and a second chamber to form the carbon canister;

the fuel control valve including:
a tapered tank and a main valve gate being formed in lower and upper portions of the first chamber, respectively; a trench being formed in the tapered tank; a bottom of the tapered tank being formed with a gas tube communicated to an evaporation chamber in the fuel tank; a gas channel being formed in the main valve gate and being connected to the second chamber; and
a movable rolling ball element and a floatable plug element which are installed between the tapered tank and the main valve gate; the floatable plug element being movably installed between the rolling ball element and the main valve gate; and a top end of the floatable plug element being formed with a plug for closing or opening the main valve gate; and
the carbon canister including:
a plurality of non-woven cloth and active carbon being installed within the second chamber; and
at least one gas return tube which is connected to the fuel gas inlet of the engine;
thereby the engine operates to form a negative pressure making the evaporated fuel gas flowing from the fuel tank through the gas tube, trench, main valve gate and gas channel to the second chamber of the hollow chamber, and then flowing from the hollow chamber through the gas return tube and the fuel gas inlet to the engine.

2. The device as claimed in claim 1, wherein the hollow can is a transversally arranged hollow can and the first chamber and second chamber are arranged at the left/right side and right/left side of the hollow can, respectively; the tapered tank and the main valve gate are arranged vertically and the gas tube protrudes vertically.

3. The device as claimed in claim 1, wherein the hollow can is a vertically arranged hollow can; the first chamber and the second chamber are arranged at the top/bottom and bottom/top of the hollow can, respectively; the tapered tank and the main valve gate are arranged vertically; and the gas tube extends to lateral side of the first chamber to protrude out.

4. The device as claimed in claim 3, wherein the vertically arranged hollow can is formed with an external connecting tube on the gas channel and the second chamber is installed with a guide tube; and a connecting tube is connected between the external connecting tube and the guide tube.

5. The device as claimed in claim 3, wherein the gas channel in the vertically arranged hollow directly extends to bottom of the first chamber to form as an extension channel which is communicated to the second chamber.

6. The device as claimed in claim 1, wherein the second chamber is formed with a fuel gas flow tube which is connected to outside.

7. The device as claimed in claim 1, wherein the gas channel has a pressure releasing hole and is connected to a bypass valve so as to be connected to outside.

8. The device as claimed in claim 7, wherein the bypass valve includes a lock stud on the first chamber of the hollow can; the lock stud is installed with an venting hole and a spring receiving hole which are communicated to the pressure releasing hole; a spring is installed within the spring receiving hole; the spring pushes against a round ball for sealing or opening the pressure releasing hole.

9. A fuel tank for an engine, comprising:
a hollow can which includes a first chamber for installing a fuel control valve and a second chamber to form a carbon canister;

the fuel control valve including:

a tapered tank and a main valve gate being formed in lower and upper portions of the first chamber, respectively; a trench being formed in the tapered tank; a bottom of the tapered tank being formed with a gas tube; a gas channel being formed in the main valve gate and being connected to the second chamber; and a movable rolling element and a floatable plug element which are installed between the tapered tank and the main valve gate; the floatable plug element being movably installed between the rolling ball element and the main valve gate; and a top end of the floatable plug element being formed with a plug for closing or opening the main valve gate; and the carbon canister including:

a plurality of non-woven cloth and active carbon being installed within the second chamber; and at least one gas return tube which is connected to a fuel gas inlet of the engine; and a fuel tank casing filled with fuel liquid thereinside, an assembled hole being formed on the casing so that the gas tube is connected with the assembled hole to assemble the hollow can on the casing;

thereby when an evaporation chamber is formed above a surface of the fuel liquid at top portion of the casing, the engine operates to form a negative pressure making evaporated fuel gas in the evaporation chamber flowing from the fuel tank through the gas tube communicated to the evaporation chamber, trench, main valve gate and gas channel to the second chamber of the hollow chamber, and then flowing from the hollow chamber through the gas return tube and the fuel gas inlet to the engine, or when the fuel liquid is overfilled or tilted to drain out of the casing through the gas tube and the trench to the first chamber of the hollow can, the floatable plug element floats upwards with the level of the fuel liquid so that the plug engages with the main valve gate to close the gas channel so as to prevent the fuel liquid from flowing into the second chamber.

10. The device as claimed in claim 9, wherein the hollow can is a transversally arranged hollow can and the first chamber and second chamber are arranged at the left/right and right/left side of the hollow can, respectively; the tapered tank and the main valve gate are arranged vertically and the gas tube protrudes vertically.

11. The device as claimed in claim 9, wherein the hollow can is a vertically arranged hollow can; the first chamber and the second chamber are arranged at the top/bottom and bottom/top of the hollow can, respectively; the tapered tank and the main valve gate are arranged vertically; and the gas tube extends to lateral side of the first chamber to protrude out to be connected to assembled hole at top of the fuel tank casing; and thus the hollow can is assembled at the top of the fuel tank casing.

12. The device as claimed in claim 11, wherein the vertically arranged hollow can is formed with an external connecting tube on the gas channel and the second chamber is installed with a guide tube; and a connecting tube is connected between the external connecting tube and the guide tube.

13. The device as claimed in claim 11, wherein the gas channel in the vertically arranged hollow directly extends to bottom of the first chamber to form as an extension channel which is communicated to the second chamber.

14. The device as claimed in claim 9, wherein the second chamber is formed with a fuel gas flow tube which is connected to outside.

15. The device as claimed in claim 9, wherein the gas channel has a pressure releasing hole and is connected to a bypass valve so as to be connected to outside.

16. The device as claimed in claim 15, wherein the bypass valve includes a lock stud on the first chamber of the hollow can; the lock stud is installed with an venting hole and a spring receiving hole which are communicated to the pressure releasing hole; a spring is installed within the spring receiving hole; the spring pushes against a round ball for sealing or opening the pressure releasing hole.

* * * * *